UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

SOLVENT OF ACETYL CELLULOSE.

1,041,114.  Specification of Letters Patent.  Patented Oct. 15, 1912.

No Drawing.  Application filed November 7, 1911. Serial No. 659,033.

*To all whom it may concern:*

Be it known that I, WILLIAM G. LINDSAY, a citizen of the United States, residing in Caldwell, county of Essex, State of New Jersey, have invented certain new and useful Improvements in Solvents of Acetyl Cellulose, of which the following is a specification.

The various compositions to which the present invention relates are employed in the art, sometimes as imitations of natural substances and sometimes as films which are used for photographic purposes.

Although the final or useful form of the different compounds of acetyl cellulose is that of a solid or dried material, the different processes of conversion into this final solid form involve, as is well understood, the employment of solutions or mixtures of varying consistency as to plasticity, stiffness of fluidity, dependent generally upon the proportion and kind of solvent used to the amount of the original base-acetyl cellulose.

In the treatment of acetyl cellulose for the production of plastic masses which can be utilized in a manner similar to the nitrocellulose compounds, the best known of which has received the trade name of "celluloid", and the production of solutions for the manufacture of lacquers, varnishes, photographic films and flexible compounds, I have discovered that trichlorhydrin $CH_2Cl.CHCl.CH_2Cl$, a compound having a boiling point of about 170° C., when admixed with an equal volume of either ethyl or methyl alcohol (although these exact proportions are not absolutely essential) is a good and useful solvent for acetyl cellulose and solutions therewith show a high viscosity and volatilize slowly. For instance, a useful and solvent mixture can be made by incorporating one volume of methyl alcohol with three volumes of trichlorhydrin.

This new compound solvent may be used either alone or in conjunction with other solvents or non-solvent liquids or solids, such as ether, acetone, ethyl acetate, camphor and its substitutes, etc.

It will be understood by those skilled in the art that acetone, for instance, is a solvent by itself of some varieties of acetyl cellulose, and it will likewise be understood that alcohol and ether are non-solvents; while again, epichlorhydrin and chloroform are solvents. This will instruct the operator that my new compound solvent consisting of trichlorhydrin and either ethyl or methyl alcohol, may be used in conjunction with substances such as I have indicated which, either as solvents in themselves for acetyl cellulose, or as non-solvents in themselves, are used to restrain the volatility of the other ingredients to adapt the compound for the individual purposes for which it is to be used and what varying degrees of temperature, pressure and atmospheric exposure should be used to accomplish the object.

As one example or method of carrying out my invention practically, I proceed as follows:—I take one part of acetyl cellulose and introduce it into ten parts by weight of a mixture of trichlorhydrin and ethyl alcohol in equal volumes, and mix the cellulose and solvent thoroughly by stirring at the ordinary temperature of the room. The acetyl cellulose will dissolve and upon evaporation of the solvent there will be a resultant solid either in the form of a mass or in the form of a film.

It will be understood that coloring matters and inert substances may be introduced into the massive compounds if desired, and that the introduction of other solvents or non-solvents will have a resultant modification upon the length of time required and the result produced by the use of my new compound solvent, but those actions and results will be readily understood by those skilled in the art.

As a mixture of trichlorhydrin with methyl alcohol in equal volumes, will have a solvent action upon the acetyl cellulose, I include both ethyl and methyl alcohol as equivalents for the purposes of this specification and invention.

I have found that as the proportion of alcohol is increased with respect to the trichlohydrin, the solvent action of the resultant mixture gradually decreases, but upon the application of heat the solvent power of the mixture is restored.

What I claim and desire to secure by Letters Patent is:—

1. A new composition of matter consisting of a solution of acetyl cellulose in a mixture of trichlorhydrin and one or more of the group of hereinbefore-described alcohols (ethyl alcohol, methyl alcohol), substantially as described.

2. A new composition of matter consisting of a solution of acetyl cellulose in a mixture of trichlorhydrin and one or more of the group of hereinbefore-described alcohols (ethyl alcohol, methyl alcohol), said trichlorhydrin and the alcohol or alcohols being in equal volumes, substantially as described.

3. A new composition of matter consisting of a solution of acetyl cellulose in a mixture of trichlorhydrin and one or more of the group of hereinbefore-described alcohols (ethyl alcohol, methyl alcohol), in combination with other substances either in a liquid or solid form, substantially as described.

4. A new composition of matter consisting of a solution of acetyl cellulose in a mixture of trichlorhydrin and one or more of the group of hereinbefore-described alcohols (ethyl alcohol, methyl alcohol), said trichlorhydrin and the alcohol or alcohols being in equal volumes, in combination with other substances either in liquid or solid form, substantially as described.

5. The new solvent for acetyl cellulose consisting of trichlorhydrin in admixture with one or more of the group of hereinbefore - described alcohols (ethyl alcohol, methyl alcohol), substantially as described.

6. The new solvent for acetyl cellulose consisting of trichlorhydrin in admixture with one or more of the group of hereinbefore - described alcohols (ethyl alcohol, methyl alcohol), said trichlorhydrin and alcohol or alcohols being in equal volumes, substantially as described.

WILLIAM G. LINDSAY.

Witnesses:
IRVING M. WEISS,
J. E. HINDON HYDE.